United States Patent
Saada et al.

(10) Patent No.: US 10,171,557 B2
(45) Date of Patent: Jan. 1, 2019

(54) METHOD AND DEVICE FOR PROCESSING MEDIA STREAMS BETWEEN A PLURALITY OF MEDIA TERMINALS AND A PROCESSING UNIT ALL CONNECTED TO ONE ANOTHER OVER A COMMUNICATION NETWORK

(75) Inventors: Stèphane Saada, Pale (FR); Marin Osmond, Rennes (FR)

(73) Assignee: ALCATEL LUCENT, Boulogne Billancourt (FR)

( * ) Notice: Subject to any disclaimer, the term of this patent is extended or adjusted under 35 U.S.C. 154(b) by 18 days.

(21) Appl. No.: 13/703,744

(22) PCT Filed: Jun. 21, 2011

(86) PCT No.: PCT/EP2011/060276
§ 371 (c)(1),
(2), (4) Date: Feb. 28, 2013

(87) PCT Pub. No.: WO2011/161073
PCT Pub. Date: Dec. 29, 2011

(65) Prior Publication Data
US 2013/0159471 A1    Jun. 20, 2013

(30) Foreign Application Priority Data

Jun. 22, 2010 (FR) ...................... 10 54948

(51) Int. Cl.
*H04L 29/04* (2006.01)
*H04L 29/08* (2006.01)
*H04L 29/06* (2006.01)

(52) U.S. Cl.
CPC .......... *H04L 67/10* (2013.01); *H04L 65/4038* (2013.01)

(58) Field of Classification Search
CPC . H04L 65/4038; H04L 65/403; H04L 65/605; H04L 12/1827; H04L 67/10; H04M 3/567; H04N 7/15; H04N 7/152
USPC .......................................................... 709/219
See application file for complete search history.

(56) References Cited

U.S. PATENT DOCUMENTS

| | | | |
|---|---|---|---|
| 2003/0046344 A1* | 3/2003 | Kumhyr | H04L 12/1822 709/205 |
| 2006/0132596 A1 | 6/2006 | Ahonen | |
| 2007/0263824 A1* | 11/2007 | Bangalore et al. | 379/202.01 |
| 2008/0285571 A1* | 11/2008 | Arulambalam et al. | 370/400 |

(Continued)

FOREIGN PATENT DOCUMENTS

| | | |
|---|---|---|
| WO | WO 2006/096557 A2 | 9/2006 |
| WO | WO 2007/129942 A1 | 11/2007 |

OTHER PUBLICATIONS

"Using Integrated VoIP". Posted Jun. 16, 2008 at <http://wlc.webex.com/docs/job_aids/IntegratedVoIP_JA.pdf>.*

(Continued)

*Primary Examiner* — Scott B Christensen
(74) *Attorney, Agent, or Firm* — Fay Sharpe LLP

(57) ABSTRACT

The media stream processing device between a plurality of media terminals (UA, UB, UC, UD) and a processing unit (UV) over a communication network. The processing unit (UV) is capable of sending a media stream transmission pause/resume command signal in the format of a RTP/RTCP real-time communication protocol or equivalent intended for at least one media terminal in response to a chosen event.

5 Claims, 3 Drawing Sheets

(56) References Cited

U.S. PATENT DOCUMENTS

2009/0300520 A1   12/2009  Ashutosh et al.
2012/0076288 A1*   3/2012  Rodman et al. ......... 379/202.01

OTHER PUBLICATIONS

International Search Report for PCT/EP2011/060276 dated Aug. 29, 2011.

* cited by examiner

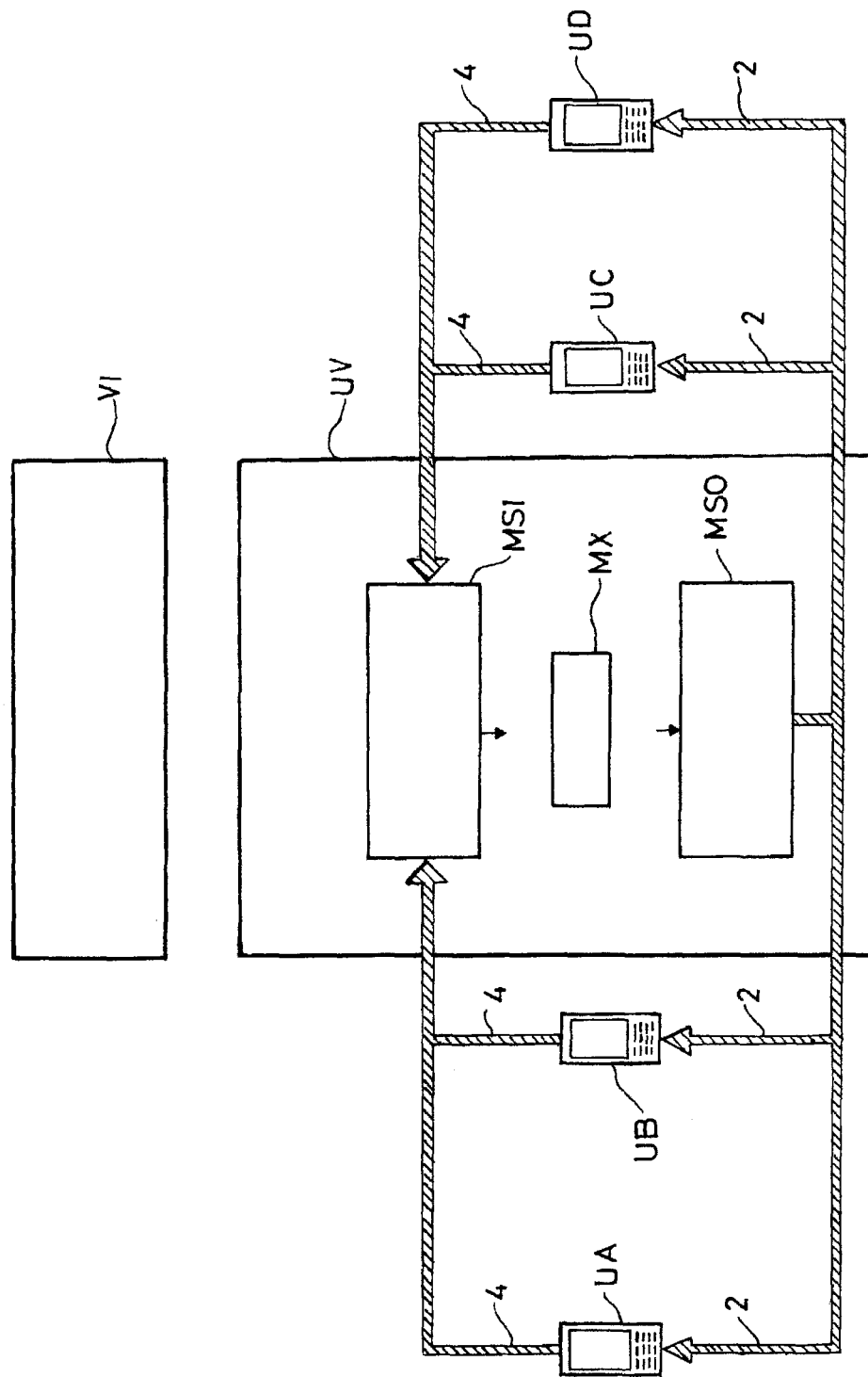
FIG_1

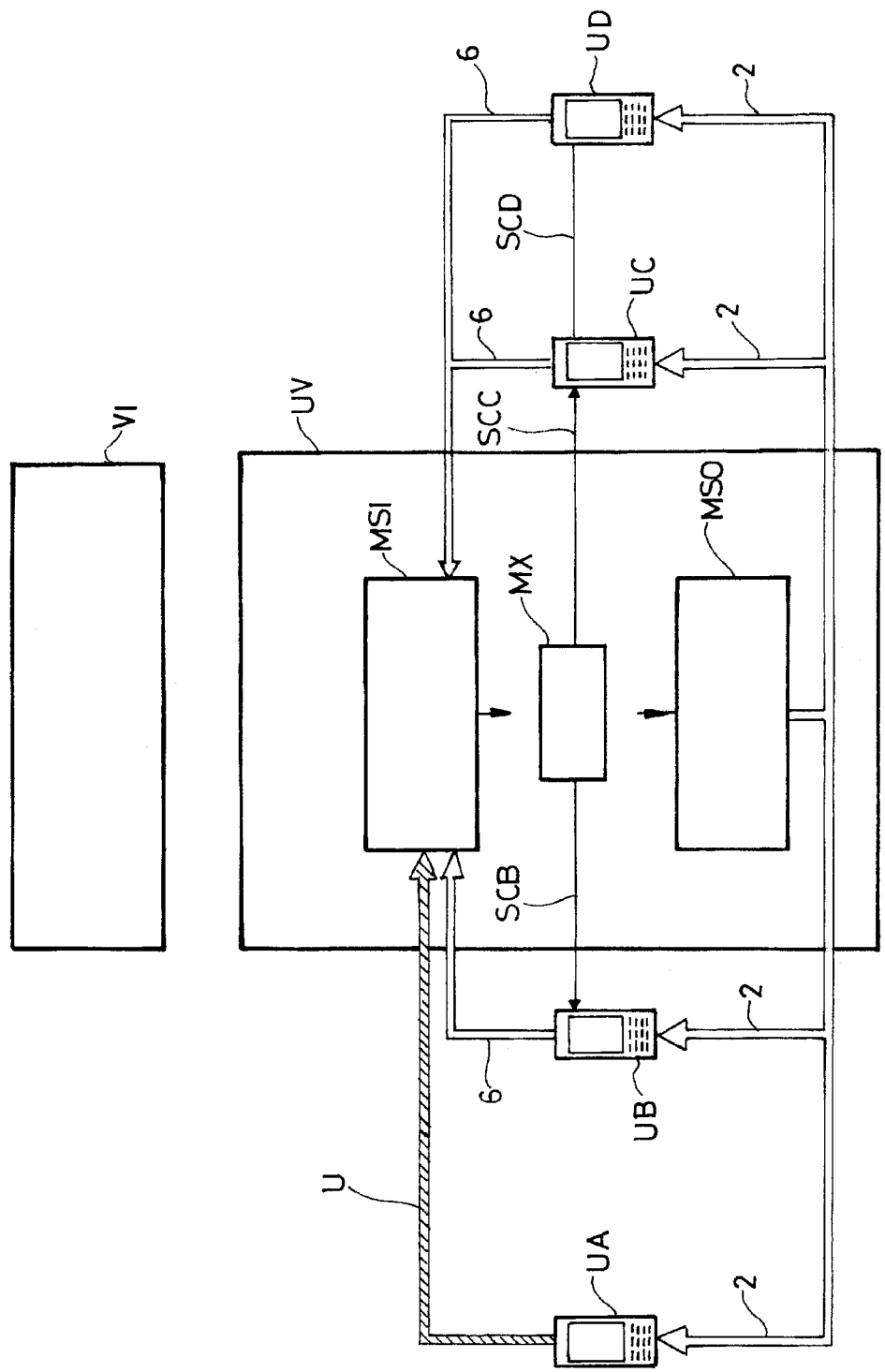
FIG_2

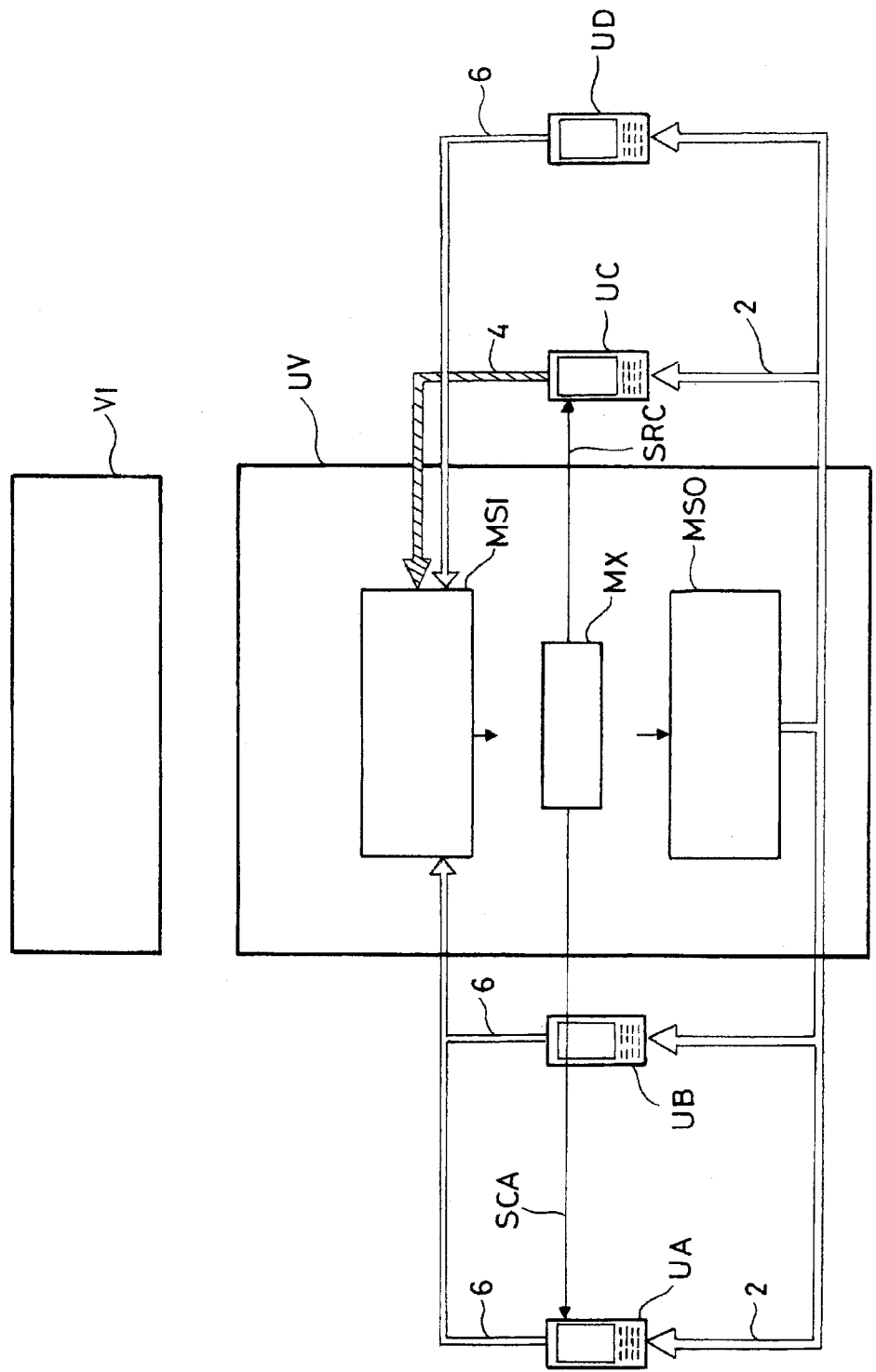
FIG_3

METHOD AND DEVICE FOR PROCESSING MEDIA STREAMS BETWEEN A PLURALITY OF MEDIA TERMINALS AND A PROCESSING UNIT ALL CONNECTED TO ONE ANOTHER OVER A COMMUNICATION NETWORK

The present invention pertains to the processing of media streams between a plurality of media terminals and a processing unit over a communication network.

It has a general application in communication between multiple media terminals such as cellphones, computers, personal digital assistants, and more particularly videoconferencing or in similar circumstances.

In a videoconference, the audio and video media streams from each participant are received by a processing unit that selects the active participant(s) intended to be displayed on the participants' media terminals, and which sends the audio and video media stream(s) of the active participant(s) to the other participants.

In this context, not all the other participants' audio and video media streams are being used by the processing unit, and are not displayed alongside those that are. The result is needless consumption of the communication network's bandwidth. For example, in a videoconference with five participants, 80% of the network's bandwidth is unneeded, which constitutes a significant waste of radio, core network, transmission, and application resources.

The Applicant has taken up the issue of remedying this shortcoming while preserving fluidity, speed, and responsiveness in processing media streams.

The present invention provides a solution to this problem.

It pertains to a method and device for processing media streams between a plurality of media terminals and a processing unit over a communication network According to one general definition of the invention, the processing unit sends a command signal to pause/resume the transmission of the media stream in the form of an RTP/RTCP real-time communication protocol or its equivalent intended for at least one media terminal in response to a chosen event.

Thus, owing to the invention, according to a chosen event, for example using videoconferencing, depending on the sound activity of the participants, the processing unit pauses or resumes the media activity (video and/or audio) of said participants on the communication network. Additionally, thanks to the RTP/RTCP command signal, the activity is paused or resumed in real time and at the bottom level of the communication protocol, which encourages fluid, fast, responsive processing of media streams.

In one embodiment, the processing unit comprises a module to detect the sound activity of media terminals.

In practice, the command signal is able to pause/resume the transmission of at least one media terminal's media streams depending on the sound activity of said media terminal detected in this way.

In another embodiment, the processing unit comprises a reception module capable of receiving a chosen request, and the command signal is capable of pausing/resuming the transmission of at least one media terminal's media streams depending on the request thereby received. For example, the request emanates from a participant who is playing the role of moderator.

It is also an object of the present invention to have a device for processing media streams between a plurality of media terminals and a processing unit over a communication network.

According to another aspect of the invention, the processing unit is capable of transmitting a command signal to pause/resume the transmission of the media stream in the form of an RTP/RTCP real-time communication protocol or its equivalent intended for at least one media terminal in response to a chosen event.

Other characteristics and advantages of the invention will become apparent upon examining the detailed description below, and the attached drawings, wherein:

FIG. 1 schematically depicts an architecture of a system implementing a videoconference; and FIGS. 2 and 3 schematically depict the videoconferencing system of FIG. 1 in which the inventive processing method is implemented.

FIG. 1 shows the architecture of a videoconferencing system between four media terminals UA, UB, UC, and UD, for example cellphones, computers, personal digital assistants, or likewise. The media terminals are connected to a videoconferencing processing unit UV via a communication network, such as an IMS ("IP Multimedia System") network.

The videoconferencing system comprises an application server VI that controls the sessions and organizes the conference and a videoconferencing unit UV, generally in the form of a media server that provides the following main functions:

a participant selection module that determines which participant(s) is/are to be retransmitted to the other participants. Generally, the selection module is a sound activity detection module, also called a VAD module, for "Voice Activity Detection". The videoconferencing unit selects the N loudest participants in terms of sound activity in order to mix them. The other participants are muted. If one of the participants wishes to speak, the VAD module detects him or her, and if that participant's sound activity is sufficient, he or she is included with the active participants and mixed with the others; and a mixing module MX that receives the media streams 6 (audio and video) coming from media terminals via an input interface MSI, and which redistributes the media streams after mixing 2 intended for the participants through an output interface MSO.

In practice, the module MX mixes the audio flows of the N participants who are most active when it comes to sound, and redistributes them to the other participants. The module MX selects the participant who is most active when it comes to sound, and sends the corresponding video stream to all participants. In one variant, the module MX mixes into a single image the N most active participants (for example, by partitioning the screen) and sends their images to the other participants.

In this context, the video parts of the media streams 4 coming from the participants who are not active when it comes to sound are needless because they are not actually used or displayed by the participants.

With reference to FIG. 2, the videoconferencing unit UV sends a pause command signal SC to participants who are not active when it comes to sound in order to pause their video streams and thereby to save the network's resources.

For example, in the event that the participant UA is active when it comes to sound, and the participants UB, UC, and UD are inactive, the videoconferencing unit UV sends a pause signal SC, individualized as SCB, SCC, and SCD respectively to the terminals UB, UC, and UD.

In this context, the participant UA sends the audio and video stream 4 to the input interface MSI and receives the audio and video stream 2 coming from the output interface MSO, after mixing. The participants UB, UC, and UD respectively send only their audio streams 6 to the input interface MSI, the video stream's portion being paused in response to the receipt of the pause signal SC.

In one variant, the videoconferencing unit UV comprises a reception module (not depicted) that receives a chosen request, for example one emanating from a participant UA who plays the role of conference moderator. In response to that request, for example, the moderator UA falls silent and allow the participant UB to speak, a signal SC to pause the transmission of media streams is then sent to the participants UA, UC and UD.

FIG. 3 depicts the videoconferencing system in which the participant UC becomes active when it comes to sound.

The activity of the participant UA is detected by the detection module. In response to that detection, the videoconferencing unit UV sends a resume command signal SRC to the participant UC and a pause signal SCA to the participant UA.

In response to the resume command signal SRC, the participant UC becomes active and sends the audio and video streams 4 to the input interface MSI.

In response to the pause command signal SCA, the participant UA becomes inactive and sends only its audio stream 6 to the input interface MSI.

In the "moderator" variant, the moderator may allow another participant to speak, after the intervention of the participant UB, for example in allowing the participant UD to speak. In such a case, a pause signal is sent to the participant UB while a resume signal is sent to the participant UD.

To preserve a fluid, fast, responsive videoconference, the video stream pause and resume command signal is chosen in the form of an RTP (Real time transport Protocol) or RTCP (Real Time Transport Control Protocol) real-time communication protocol.

For example, the video stream transmission pause (PAUSE) or resume (RESUME) command signal complies with the document RFC 3550. This compliance makes it possible to ensure compatibility with media terminals that do not implement the processing mechanism described above. In such a case, only the application layer is affected by this mechanism, directly after the processing of packets by the RTP layer. This method is therefore faster and more responsive than going through signalling.

In response to a pause command signal (PAUSE), the media terminal's RTP layer stops sending RTP packets, asks the audio or video transcoder to stop processing it, does not ask the RTP layer to close its UDP/TCP ends in order to reuse them in a new SDP negotiation (RFC3264), does not ask the RTP layer to stop receiving the RTP packets and asks the RTP layer to send empty packets or to continue to send RTCP packets SR and to receive packets RR.

In response to a resume command signal (RESUME), the media terminal's application layer asks the audio or video transcoder to restart its processing and to ask the RTP layer to send RTP packets.

In one variant, a new RFC document is intended to be implemented in media terminals, as well as in the videoconferencing unit. The processing mechanism in accordance with the invention is applied only within the media terminals' RTP/RTCP layers. The RTP/RTCP layer stops the transmission of RTP packets in response to an RTCP message to pause transmission (PAUSE) and resumes transmitting the RTP video stream in response to a transmission resume message (RESUME).

The invention claimed is:

1. A method for processing media streams between a plurality of media terminals and a processing unit over a communication network, the method comprising, by the processing unit:
   receiving, from each of the media terminals, corresponding media streams comprising video transmission and audio transmissions;
   monitoring sound activity of each of the media terminals from the audio transmissions;
   selecting the N loudest participants based on the monitored sound activity, wherein the selected participants are identified as active participants and non-selected participants are identified as non-active participants;
   pausing audio transmissions while permitting video transmissions from the non-active participants by transmitting a first pause signal to the non-active participants to pause the audio transmissions from the non-active participants;
   receiving a request from a moderator terminal to permit a selected non-active participant terminal to resume audio transmissions in addition to the video transmissions;
   in response to the request, transmitting a resume signal to the selected non-active participant terminal and transmitting a second pause signal to one or more active participants to pause both audio and video transmissions,
   wherein the resume signal, first pause signal, and second pause signal are in the form of and RTP/RTCP real-time communication protocol.

2. A method according to claim 1, wherein the processing unit comprises a module to monitor the sound activity of media terminals.

3. A method according of claim 2, wherein the processing unit sends a command signal capable of pausing/resuming the transmission of the media stream depending on the sound activity of said media terminal.

4. A method according to claim 1, wherein the processing unit comprises a reception module capable of receiving a chosen request and is configured to send a command signal capable of pausing/resuming the transmission of the media stream.

5. A device comprising a processor for processing media streams between a plurality of media terminals and the processor over a communication network, wherein said processor is configured to:
   receive, from each of the media terminals, corresponding media streams comprising video transmission and audio transmissions;
   monitor sound activity of each of the media terminals from the audio transmissions;
   select the N loudest participants based on the monitored sound activity, wherein the selected participants are identified as active participants and non-selected participants are identified as non-active participants;
   pause audio transmissions while permitting video transmissions from the non-active participants by transmitting a first pause signal to the non-active participants to pause the audio transmissions from the non-active participants;
   receive a request from a moderator terminal to permit a selected non-active participant terminal to resume audio transmissions in addition to the video transmissions;
   in response to the request, transmit a resume signal to the selected non-active participant terminal and transmit a second pause signal to one or more active participants to pause both audio and video transmissions,
wherein the resume signal, first pause signal, and second pause signal are in the form of an RTP/RTCP real-time communication protocol.

* * * * *